May 23, 1933.  M. F. WATERS  1,910,728
OIL AND GAS SEPARATOR
Filed July 11, 1930  5 Sheets-Sheet 5

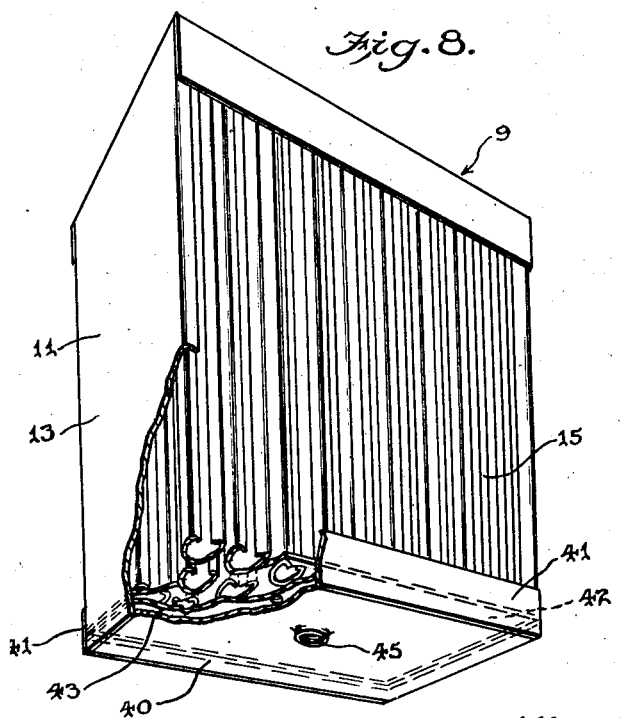
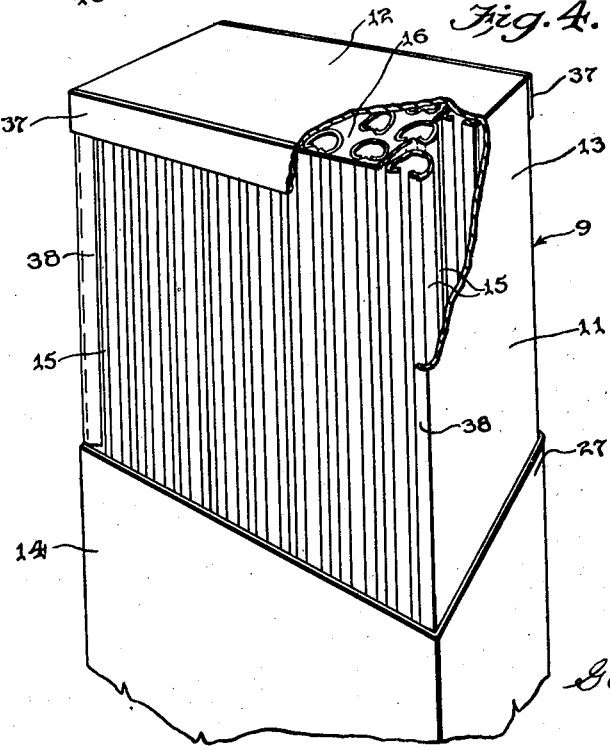

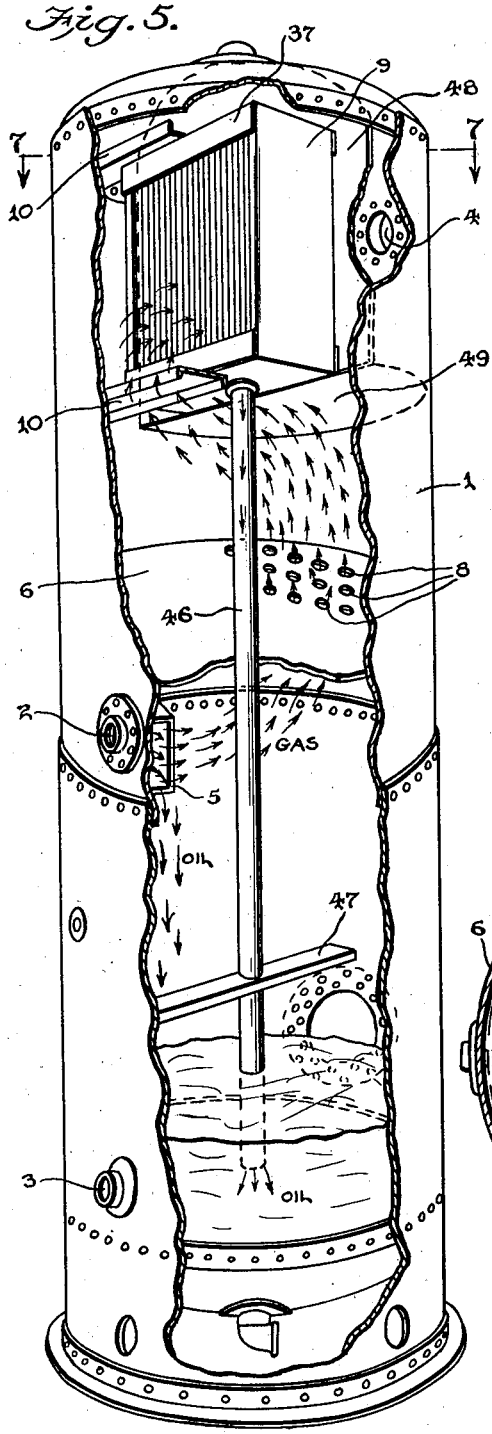
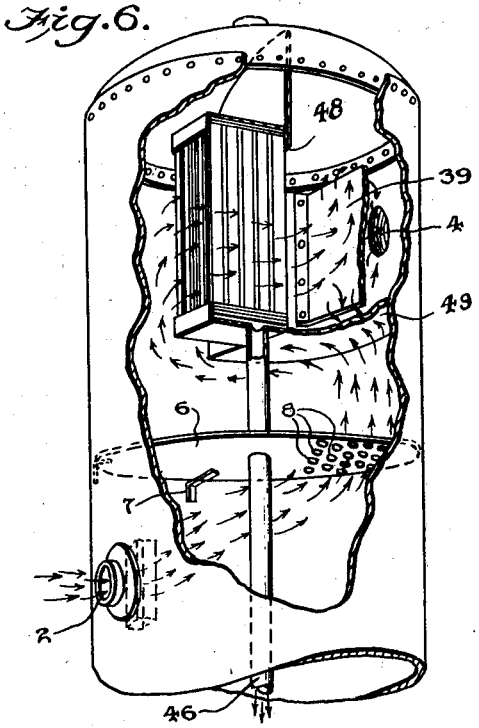
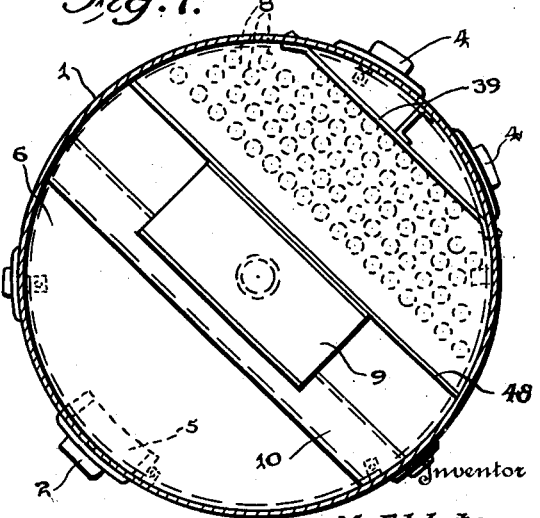

Inventor
M. F. Waters,
By George A. Prevost
Attorney

Patented May 23, 1933

1,910,728

UNITED STATES PATENT OFFICE

MILLARD F. WATERS, OF TULSA, OKLAHOMA, ASSIGNOR TO HANLON-WATERS, INC., OF TULSA, OKLAHOMA

OIL AND GAS SEPARATOR

Application filed July 11, 1930. Serial No. 467,299.

My invention consists in new and useful improvements in apparatus for separating liquids from gases and while the embodiment of the invention illustrated and described hereinafter, is particularly adapted for use in separating oils from gases, the apparatus and the basic principle upon which the same operates can be employed with equal advantage as a scrubber tank in gas and air lines, and it may be used in connection with flow tanks, storage tanks, accumulators, or as a steam separator and in fact with any apparatus where it is desired to separate liquids and solids from air or gas.

The main object of my invention is to provide means for taking advantage of the principle of differences in the mass or density of liquids or solids and gases through expansion of the gas which is the carrying agent of the liquid or solid, combined with a collecting surface in direct line with the straight flow of the mixture. The basic principle of the invention lies in utilizing the effect of the velocity of the fluid to separate and maintain separation of the liquids and the gases.

It is well known that the kinetic energy of oil is 150 to 170 times greater than that of gas travelling at the same velocity. In other words, the gas being lighter in mass, will be driven aside by the oil particles and displaced when a mixture of oil and gas is introduced into my improved apparatus, causing a free separation due to the running together of the fine crops of the liquid. The effect of this kinetic energy will cause a pressure to be developed because said energy must always be absorbed by a pressure acting through some distance.

In carrying out my invention I employ a novel separating unit particularly constructed for taking advantage of the kinetic energy in gases moving at velocities proportionately great to their volumes, and also carrying suspended liquids and/or solids in a divided state, said unit causing a separation between these gases and liquids and/or solids and collecting such liquids and/or solids and conducting the same to a predetermined location within the main separator tank.

With the above and other objects in view which will appear as the description proceeds, my invention consists in the novel features herein set forth, illustrated in the accompanying drawings, and more particularly pointed out in the appended claims.

Referring to the drawings in which numerals of like character designate similar parts throughout the several views, Figure 1 is a view in side elevation of an oil and gas separator tank, partially broken away, showing the preferred form of my invention.

Figure 4 is an enlarged view of the preferred form of the separator element and liquid receptacle.

Figure 5 is a view similar to Fig. 1 but illustrating a modified form of separator element.

Figure 6 is a similar view showing the element and baffles in section.

Figure 7 is a sectional view taken on line 7—7 of Fig. 5.

Figure 8 is an enlarged view partially broken away showing the modified form of separator element.

Figure 14 is an enlarged perspective view of one of the separator sections looking from the front or entering face.

Figure 1:
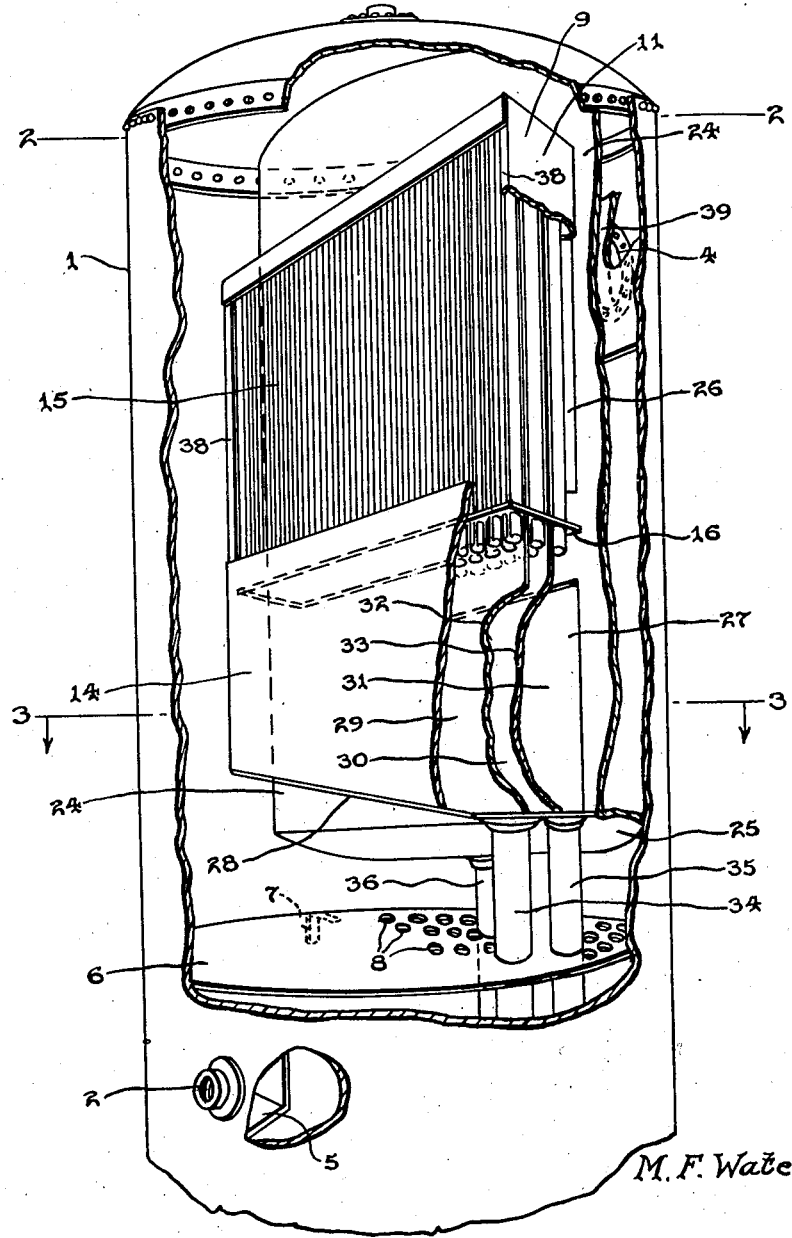
Figure 2:
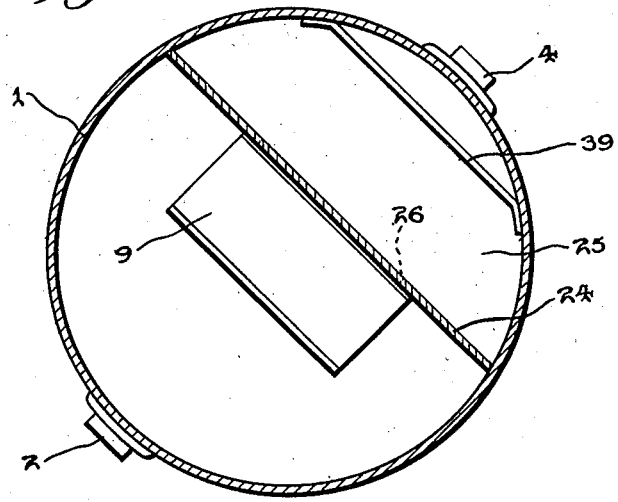
Figure 2 is a sectional view taken on line 2—2 of Fig. 1.
Figure 3:
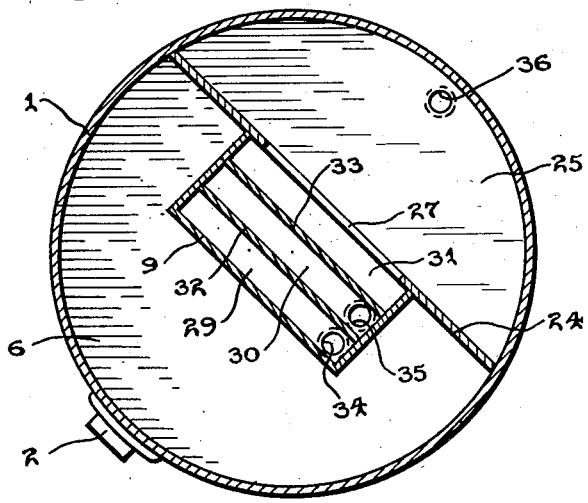
Figure 3 is a sectional view taken on line 3—3 of Fig. 1.
Figure 9:
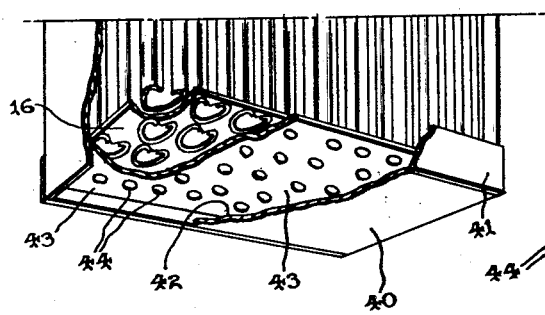
Figure 9 is a view of the lower portion of the separator element shown in Fig. 8, with the bottom broken away to illustrate the perforated false bottom.
Figure 10:
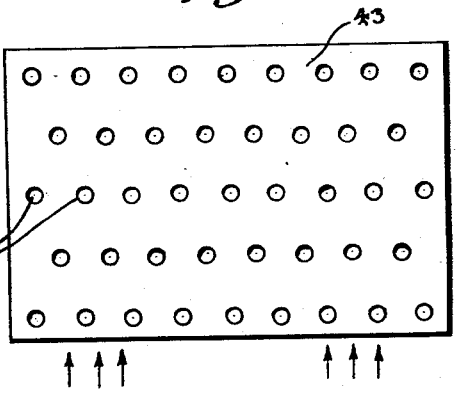
Figure 10 is a plan view of said false bottom.
Figure 11:
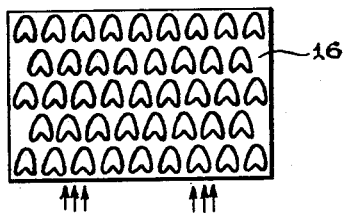
Figure 11 is a plan view of one of the spacing members for retaining the separator sections in spaced relation within the separator element.
Figure 12:
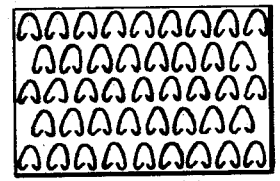
Figure 12 is a diagrammatic view showing the relative positions of the various rows of separator sections.

In the drawings, 1 represents a separator tank which may be of any conventional form, having an oil and gas inlet 2 in the wall thereof, preferably substantially midway of its longitudinal extremities, and an oil outlet 3, Fig. 5, in the lower portion of said wall adjacent the bottom of the tank. Gas outlets 4 are located in the opposite wall of the tank adjacent the upper end thereof.

Inside the tank 1, immediately adjacent the oil and gas inlet 2, I provide a deflector 5 which may be of any design, but is preferably of a type which will divert the oil downwardly or in a circular motion around the inner circumference of the tank. 6 represents a primary circular baffle plate rigidly secured within the tank 1 slightly above the oil and gas inlet 2, the periphery of said baffle being slightly smaller than the inner circumference of the wall of the tank, whereby the outer edge of said baffle is spaced apart from the inside wall of the tank. This baffle may be secured to the tank by any suitable means such as angles or brackets 7, and is provided on the side opposite the oil and gas inlet 2 with a series of perforations 8, the remaining area of said baffle being imperforate.

9 designates my improved separating element which is box-like in shape and secured within the upper end of the tank 1 preferably by means of channel irons or the like 10, Fig. 5, which are rigidly secured to the walls of the tank by any suitable means.

The separating element according to the preferred form of my invention, illustrated in Figs. 1 to 4, comprises an outer box or container 11 of any suitable material, having a top wall 12 and end walls 13, the front and rear sides and the bottom of said container being open, the latter being adapted to fit within the open upper end of a liquid receptacle 14 hereinafter described.

Within the container 11 I provide a series of separator sections 15 which are arranged in a plurality of rows, in staggered relation, each of said sections extending vertically for substantially the entire depth of the container and being secured in place by means of upper and lower spacer members 16.

Figure 13:
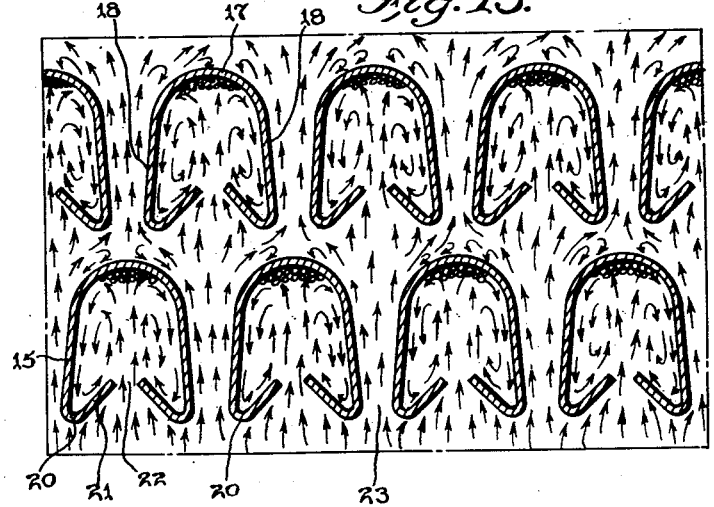
Figure 13 is an enlarged view of a number of sections with arrows indicating the course of the gas and entrained liquids or solids as it passes through the separator element.

Each of the sections 15 consists of an elongated tube-like structure substantially semi-circular in cross section at its rear extremity 17, (see Fig. 13) its side walls 18 being straight and flaring slightly outwardly toward its forward extremity. The vertical forward edges of the side walls 18 are rounded as at 20, and bent inwardly toward one another at an angle of substantially 45° to form flanges 21, the free edges of which are spaced apart leaving a vertical opening 22 within and substantially centrally of the forward extremity of the section. It will be seen from Fig. 13 that when the sections 15 are in place within the container 11, a relatively narrow space 23 is provided between each section at its forward end, said spaces 23 gradually expanding toward the rear portions of the sections for the purpose hereinafter set forth. It will also be noted that each of the spaces 23 between the sections of one row is in direct line with the openings 22 of the next row behind.

24 represents a vertical baffle which extends transversely of the tank 1, immediately adjacent the rear of the element 9, said baffle extending upwardly and contacting with the extreme upper end or head of the tank, and downwardly to a point adjacent the lower extremity of the receptacle 14, where it is bent toward the shell of the tank to form a semi-circular baffle 25. This semi-circular baffle is cut to fit snugly against the inner wall of the tank 1 and is inclined slightly downwardly from the baffle 24 as clearly shown in Fig. 1. The vertical edges of the baffle 24 fit snugly against the walls of the tank 1, said baffle being provided with openings 26 and 27 adjacent the rear portions of the separator element 9 and the receptacle 14 respectively for the purpose hereinafter set forth.

It will thus be seen that this baffle structure 24, 25 when welded or otherwise rigidly secured to the tank, completely encloses that portion of the tank immediately behind the separator element and receptacle, forming a gas outlet compartment adjacent the gas outlet 4, the only entrance to which is by way of the separator element.

The receptacle 14 is relatively large as will be seen from Fig. 1 and its upper end fits over the lower portion of the element 9, extending upwardly around the same to a predetermined point above the lower ends of the separator sections 15. The baffle 24 forms the rear walls of both the separator element 9 and the receptacle 14, the lower extremity of the opening 26 being in line with the upper edge of the other walls of the receptacle 14, thus forming substantially a continuation of said walls, the opening 27 adjacent the receptacle 14 extending from a predetermined point below the lower ends of the separator sections to the lower extremity of said receptacle.

The receptacle 14 is substantially box-like in shape, its bottom 28 being downwardly inclined from one of its sides for the greater portion of its length, the remainder or lowest point of said bottom being substantially horizontal. This receptacle is divided into vertical compartments 29, 30 and 31 by the solid partitions 32 and 33 which extend from points slightly above the lower ends of the separator sections, to the bottom 28 of the receptacle 14, the partition 32 being arranged immediately behind the first two rows of separator sections, and the partition 33, behind the next two rows as clearly shown in Fig. 1.

The horizontal portion of the bottom 28 is provided adjacent the compartments 29 and 30 with openings which register with drain pipes 34 and 35 respectively and the lowest point in the semi-circular baffle 25 is likewise provided with an opening which registers with a drain pipe 36, said drain pipes 34, 35 and 36 extending downwardly through apertures in the circular baffle 6 to a suitable point in the lower portion of the tank 1, whereby any liquids knocked from the gas in passing through the separator element, are conducted to the bottom of the tank 1 as hereinafter set forth.

The top 12 of the element container 11 is provided with downwardly projecting lips 37 for bracing the structure at these points and also for preventing the escape of any gas at the upper extremity of the sections. On the front side of the container 11 I provide an inwardly projecting lip 38 along each vertical edge, which is bent rearwardly over the extreme edge of both of the end sections 15 in the front row, as shown in Fig. 4, whereby the gas and entrained liquids or solids are prevented from entering between the side of the section and the inside of the container, thus causing all of the gas to pass through the element 9.

Immediately in front of the gas outlet 4 I provide a final gas baffle 39 which is of predetermined width so that when the gas leaves the element 9 through the opening 26, it is again diverted upwardly and downwardly before it passes through the gas outlet 4, for the purpose hereinafter set forth.

Referring now to the modification shown in Figs. 5 to 10 inclusive, it will be seen that the general structure of the separator element 9 is the same as that heretofore described, with the exception that instead of the relatively large receptacle 14, I provide the container 11 with a bottom 40, the front and rear edges of which are bent upwardly to form lips 41 which together with side walls of the container 11 form a relatively shallow compartment 42 in the lower portion of the element, said compartment being bounded at its upper end by a perforated false bottom 43 arranged immediately adjacent the lower extremity of the separator sections 15. The perforations 44 of said false bottom are arranged in a plurality of rows in staggered relation, corresponding to the number and location of the rows of sections 15, whereby the lower end of each section is adjacent one of said perforations and in communication with the compartment 42.

The bottom 40 is provided with a drain outlet 45 substantially centrally thereof into which is connected a vertical drain pipe 46 which extends downwardly through a central opening in the primary baffle 6, to a point adjacent the lower extremity of the tank 1. The lower end of this drain pipe and also the drain pipes 34, 35 and 36 in the preferred form of my invention, may be braced by any suitable means such as shown at 47 in Fig. 5.

48 represents a vertical baffle similar to that described as 24 in connection with the preferred form of my invention. However, instead of extending downwardly beyond the element 9, the baffle 48 terminates at the lower extremity of said element in an angularly disposed semi-circular baffle 49 which forms a gas outlet compartment immediately behind the element 9. As in the case of my preferred form, the gas outlet is provided with a transverse baffle 39 immediately in front of the gas outlet 4.

Having thus described the construction of my improved oil and gas separator, its operation is as follows, referring particularly to the preferred form of the invention illustrated in Fig. 1:

The mixture of oil and gas enters the separator tank through the inlet 2 and immediately comes in contact with the deflector 5, by means of which the oil is diverted downwardly or in a circular motion around the tank, according to the type of inlet deflector, and the gas is permitted to rise. The gas first comes in contact with the primary baffle 6 which causes a large quantity of the liquids or solids entrained in the up-flowing gas, to be knocked back into the oil receiver. Most of the gas will pass upwardly through the apertures 8 in said baffle, but a small quantity of the same will pass around the edges of the baffle between it and the inner wall of the separator shell.

The primary function of this baffle is to break the gas up into small streams and release the greater portion of its liquid or solid content below the baffle, should there be a heavy surge or turbulence in the oil after it enters the tank 1.

The gas then proceeds upward and comes in contact with the bottom 28 of the receptacle 14 and the lower surface of the horizontal baffle 25, which cause the gas to flow horizontally across the separator tank, to enter the element 9 through its front side, said bottom 28 and baffle 25 scrubbing the gas in its travel and causing further liquid and solid content to be knocked back upon the upper surface of the primary baffle 6, from whence it flows downwardly through the peripheral space between this baffle and the inner wall of the tank. Due to the structure of the element 9 and the vertical sealing baffle 24, the gas must pass through the element 9 to reach the outlet 4.

The gas now enters the front side of the element 9, and a portion will immediately enter the first row of sections 15 through the openings 22 between the flanges 21, (see Fig.

13) and when it comes in contact with the rear semi-circular walls of the sections, becomes turbulent and is prevented from further straight line travel. The liquid is restrained from escape above by the top 12, and from the front by the inturned flanges 21 and the incoming mixture, but is permitted to pass off through the open lower ends of the separator sections 15 into the receptacle 14. The remainder of the gas entering the element 9, passes between the sections through the spaces 23 and is in a restricted stream, but as it passes rearwardly, is allowed to expand gradually, due to the increasing dimensions of the spaces 23. Taking the line of least resistance and travelling at a high velocity through the spaces 23, the gas then enters the next row of sections 15 immediately in line with the spaces 23. The oil will not divert itself as will the gas, but will travel in a straight line to the rear portion of each section, from whence it travels downwardly, assisted by gravity and the pressure of further incoming oil and gas into the respective compartments in the receptacle 14.

The liquid separated from the gas by the element 9, drops from the lower extremities of the separator sections, into the respective compartments formed in the receptacle 14. It is drained from the first two compartments 29 and 30 by the drain pipes 34 and 35 respectively, and any liquid which may be contained in the last compartment 31 drains through the opening 27 onto the upper surface of the inclined baffle 25 forming the bottom of the gas outlet chamber, from whence it is carried to the bottom of the tank by the drain pipe 36.

It will be noted that the opening 27 in the vertical baffle 24 only extends within a predetermined distance of the bottom of the element, so that when any gas or liquid descends through the last row of separator sections, it must come in contact with the front side of that portion of the baffle 24 adjacent the lower extremities of said sections, before it enters the opening 27. Thus the gas will drop any liquid that might be entrained therein before it enters the large compartment behind the baffle 24.

It will be noted that due to the kinetic energy of the gases and liquids entering each section, a considerable pressure is created within said sections. Therefore the gas and remaining liquids being unable to enter the pressure packed section, is diverted around both sides, passing the well-rounded corners 20 and entering the next compression area or space 23. The flow is then again straightened out and the gas repeats the cycle just described as many times as may be necessary to completely separate the gas and liquid contained therein.

Should a pressure drop occur through a series of rows of sections, the physical volume of gas will be greater through the last row of gas outlet openings which will result in a material increase of the kinetic energy contained in the unit volumes of gas, and will give rise to a correspondingly greater pressure increase within the sections, which will in turn affect all tendencies to cause circulation of gas and liquids within the liquid disposal means.

It is to be remembered that the effect of this kinetic energy which is the product of one half the mass multiplied by the square of the velocity, will cause a pressure to be developed because this energy must always be absorbed by a pressure acting through some distance.

Thus $P.S. = \tfrac{1}{2}M.V^2$, where P is pressure or force and S is distance, M is the mass, and V the velocity. In other words, the inertia will cause the oil particles, as well as the gas, to try to escape from the section in which it is trapped. As before stated, this is shut off from the top, and prevented by the inturned flanges 21 plus the effort of more gas and oil attempting to enter the section from the front, and therefore, must result in a downward movement of the oil which is assisted and accelerated by the action of the force of gravity. The oil particles, having run together on arrival on the inside of the walls and at the back of the sections are held in and forced out by the very thing which caused them to enter the section, namely, the velocity of the gas and oil entering the element.

The rounded edges 20 act to restrict the stream of gas as it enters the spaces 23 carrying the oil particles. The narrowest part is passed immediately, and at this point, the velocity is a maximum for the whole passage. As has been pointed out, this passage gradually increases from the narrow point and for each increment of distance back of the narrow point, there is a progressive decrease in the gas velocity, and the stream expands. This is due to the fact that the rounded edges 20 are not derived from any velocity or pressure relation but are quite sharply curved and constrict the passage to its narrowest throat immediately back of the entrance. Also due to the fact that the rearward part of this passage 23 opens along a straight line for the major portion of its distance and then widens rapidly at its rearward portion, the gases will not conform to the pressure-velocity ratio of a Venturi throat but will cause physical restriction and expansion of the stream of gases to occur in proportion and in relation to the volume of gases being handled through a passage 23 of any given dimension and constructed in this form. The oil particles, being heavier and having greater kinetic energy, will tend to carry on at the same velocity and resist any deflection in its straight path of travel. Hence, when the gas and particles of oil arrive at the face of the second row of sections, the oil will be driven into the sections and stop, while the gas will now divert and pass around to repeat the process at the next row.

A separating element of this type will cause the oil and gas particles to maintain a straight flow directly into the opening of the section back of the passage, regardless of the angle at which they enter.

It will be noted that the effect of the expanding passages 23, with their diminution of gas velocity, will cause the most finely divided oil particles to separate out, over and above the inertia effect. It will be noted that the effect of the expansion of the stream of gases in the rearward portion of the passageway 23, with their attendant diminution of gas velocity, will cause the finely divided oil particles possessed of a greater kinetic energy to separate out and leave the slowing gases to a greater extent than would ordinarily result were there no variance in the inertia of said gases.

After the gas has passed through the element 9 and is robbed of its liquid or solid content, it enters the outlet chamber back of the element 9, where it comes in contact with the final baffle 39 and is again diverted upward and downward before being discharged through the outlets 4. The purpose of this baffle 39 is to keep the gas from travelling in one particular direction after it passes through the element and permits the element to perform its function.

I find that with this preferred form of my invention just described, by providing a larger liquid collecting chamber and dividing it into compartments by means of the vertical baffles 32 and 33, I can reduce the liquid circulation which would ordinarily occur due to the drop in pressure from the front to the back of the separator element, to a minimum.

In the modified form of the invention, the bottom of each section 15 rests on a perforated false bottom so as to drain the trapped oil. The pressure inside the sections due to the gas passing through the element, will be higher than if there were no movement of gas at all. In fact it will be higher than the gas pressure in the passage, due to the kinetic energy developed in a moving stream of gas attempting to enter. With a pressure drop through the element there will be a greater volume of gas passing through the back sections since the gas volume will be greater at the lower pressure and this gas will have to speed up to get through.

It will thus be seen that I have provided a novel apparatus and principle for the separation of gases and liquids or solids which is capable of various uses and which extensive experiments have shown to be very efficient.

From the foregoing it is believed that my invention may be readily understood by those skilled in the art without further description, it being borne in mind that numerous changes may be made in the details of construction without departing from the spirit of the invention as set forth in the following claims. For instance, the spacing, location, size and shape of the sections may be varied to suit conditions and convenience of manufacture, provided that such spacing, location, size and shape is of a form to provide compression, expansion, straight line flow and collecting means substantially as described.

What I claim and desire to secure by Letters Patent is:—

1. Apparatus for separating liquid from gas comprising a tank having a liquid and gas inlet, a liquid outlet and a gas outlet, a deflector adjacent said liquid and gas inlet on the interior of said tank, a partially perforated primary baffle located above said deflector, a separating element in the upper portion of said tank comprising a housing, a plurality of baffle sections arranged in said housing in staggered relation and forming restricted, gradually expanding passageways therein, means for collecting the liquid separated in said housing, means for conducting said liquid from said housing, and baffle means adjacent said separating element forming an outlet chamber, whereby the gas must pass through said separating element before reaching said gas outlet.

2. Apparatus as claimed in claim 1 wherein said primary baffle consists of a substantially circular member having a perforated section and an imperforate section, the edges of said baffle being slightly spaced apart from the inner walls of the tank.

3. Apparatus as claimed in claim 1 wherein said primary baffle consists of a substantially circular member having a perforated section and an imperforate section, the edges of said baffle being slightly spaced apart from the inner walls of the tank, and a liquid drain pipe leading from the liquid collecting means in said housing, through said primary baffle to a point in the lower portion of the tank.

4. Apparatus as claimed in claim 1 wherein a final baffle plate is provided immediately adjacent the gas outlet within said chamber.

5. Apparatus for separating liquid from gas including a tank forming a liquid settling chamber, an outlet in said chamber, a gas outlet chamber in said tank, an inlet opening and an outlet for said last named chamber, a separating element in said tank including a housing open at its front face to the interior of said tank and at its rear face to the inlet opening of said gas outlet chamber, a liquid receptacle in communication with said separating element for collecting the liquid separated thereby, and means for conducting the liquid so collected to said settling chamber.

6. Apparatus for separating liquid from gas including a tank forming a liquid settling chamber, an outlet in said chamber, a gas outlet chamber in said tank, an inlet opening and an outlet for said last named chamber, a separating element in said tank comprising a housing open at its front face to the interior of said tank and at its rear face to the inlet opening of said gas outlet chamber, a plurality of rows of baffles arranged in staggered relation in said housing and forming restricted, gradually expanding passageways therein, the passageways of each row being in direct line with a baffle of the row next behind, a liquid receptacle in communication with the lower ends of said baffles for collecting the liquid deflected thereby, and means for conducting the liquid so collected to said settling chamber.

7. Apparatus for separating liquid from gas comprising a tank having a liquid and gas inlet, a liquid outlet in the lower portion of said tank, a gas outlet in the upper portion of said tank, a vertical partition arranged in said tank adjacent said gas outlet, its lower end extending transversely of and engaging the shell of said tank, forming a gas outlet chamber, a separating element comprising a housing arranged adjacent said partition, said housing being open to the interior of said tank at its front face, an opening in the rear face of said housing registering with a corresponding opening in said partition whereby said housing is in communication with the interior of said gas outlet chamber, a plurality of baffles in said housing, a liquid receptacle arranged adjacent the lower portion of said hausing for receiving the liquid deflected by said baffles, and means for conducting said liquid to the lower portion of said tank.

8. Apparatus for separating liquid from gas including a tank having a liquid and gas inlet, a liquid outlet and a gas outlet, a separating element comprising a housing, a plurality of rows of baffle sections arranged in staggered relation within said housing and forming restricted, gradually expanding passageways therein, the passageways of each row being in direct line with a baffle of the next row, a liquid receptacle adjacent the lower end of said housing, in communication with said baffle sections, means for conducting the liquid collected in said receptacle, to the lower portion of said tank, a gas outlet chamber within said tank adjacent said gas outlet, completely sealed from the remainder of the tank, said housing being in communication with said chamber, and means whereby any final particles of liquid which may enter said gas outlet chamber, are conducted to the lower portion of said tank.

9. Apparatus as claimed in claim 8 wherein said liquid receptacle is divided into a plurality of compartments, each having separate means for conducting liquid to the lower portion of the tank.

In testimony whereof I affix my signature.

MILLARD F. WATERS.